(12) United States Patent
Ginn

(10) Patent No.: US 8,544,772 B2
(45) Date of Patent: Oct. 1, 2013

(54) METHOD FOR THE RECOVERY OF MINERALS

(75) Inventor: Michael W. Ginn, Sandersville, GA (US)

(73) Assignee: Ginn Mineral Technology, Inc., Sandersville, GA (US)

( * ) Notice: Subject to any disclaimer, the term of this patent is extended or adjusted under 35 U.S.C. 154(b) by 370 days.

(21) Appl. No.: 13/117,631

(22) Filed: May 27, 2011

(65) Prior Publication Data

US 2012/0298010 A1 Nov. 29, 2012

(51) Int. Cl.
*B02C 19/00* (2006.01)

(52) U.S. Cl.
USPC .......... 241/23; 241/24.18; 241/24.19; 241/29

(58) Field of Classification Search
USPC ............... 241/23, 29, 24.18, 24.19; 106/463, 106/464; 423/155
See application file for complete search history.

(56) References Cited

U.S. PATENT DOCUMENTS

| | | | | |
|---|---|---|---|---|
| 5,908,701 A * | 6/1999 | Jennings et al. | ........... | 428/423.1 |
| 6,752,336 B1 * | 6/2004 | Wingard | ........... | 241/20 |
| 6,786,988 B1 * | 9/2004 | Bell | ........... | 156/72 |
| 7,045,590 B2 * | 5/2006 | Bell | ........... | 528/480 |
| 7,635,099 B1 * | 12/2009 | Meredith et al. | ........... | 241/21 |
| 7,784,719 B1 * | 8/2010 | Wingard | ........... | 241/20 |
| 2005/0209439 A1 * | 9/2005 | Bell | ........... | 528/480 |
| 2009/0117253 A1 * | 5/2009 | Hong et al. | ........... | 426/601 |
| 2009/0300982 A1 * | 12/2009 | Mauldin et al. | ........... | 47/58.1 SC |
| 2010/0044480 A1 * | 2/2010 | Lindsey et al. | ........... | 241/23 |
| 2010/0330288 A1 * | 12/2010 | Segars et al. | ........... | 427/407.1 |

* cited by examiner

*Primary Examiner* — Mark Rosenbaum

(74) *Attorney, Agent, or Firm* — Laurence P. Colton; Smith Risley Tempel Santos LLC

(57) ABSTRACT

A method of recovering a mineral product from carpet by preparing a feed of carpet pieces; thermally separating organic components from mineral components in the carpet by heating the carpet pieces to a particle bed temperature in the range of 600° C. to 1000° C., wherein the mineral component is oxidized to form a mineral oxide; slurrying the mineral oxide with water to produce 15 to 35% solids slurry within a period of approximately 30 minutes to 24 hours, whereby the mineral oxide forms a mineral hydroxide; stabilizing the pH of the slurry in the range between 6 and 10 by carbonation, resulting in a slurry containing mineral carbonates.

63 Claims, 1 Drawing Sheet

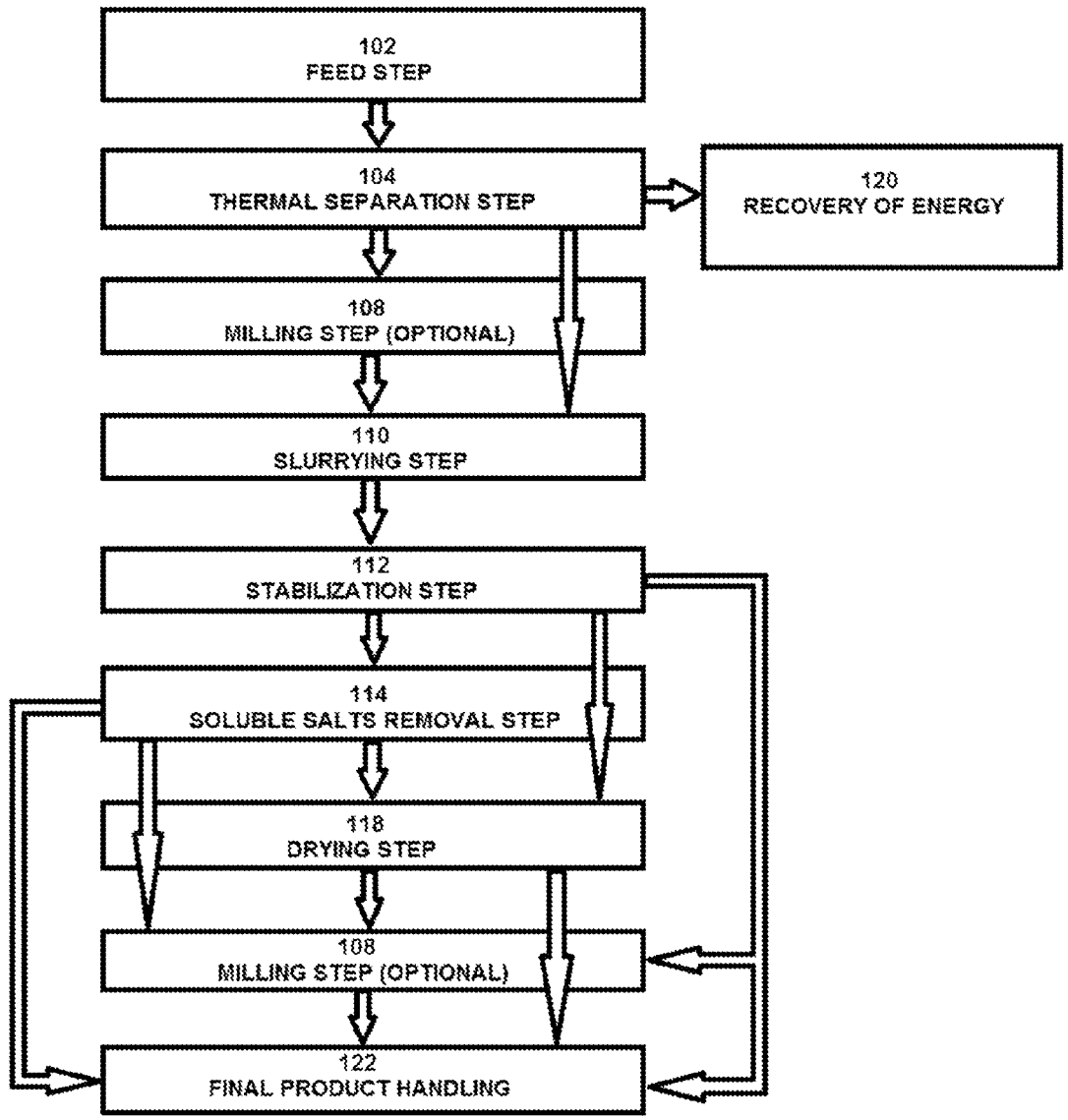

METHOD FOR THE RECOVERY OF MINERALS

BACKGROUND OF THE INVENTION

1. Technical Field

The present invention relates generally to a process applicable to the recycling and recovering of minerals and more particularly to a process for recovering minerals from waste streams. The present invention additionally relates generally to a method for the evaluation and recycling of various waste streams by recovering economically valuable minerals and more particularly to a process for recovering economically valuable minerals from waste and other carpet and from other post-consumer/post-industrial waste streams. This invention further relates to the recovery of energy from a process for recycling and recovering minerals.

2. Prior Art

As stated above the present invention is applicable to the production of post-consumer (PC) and post-industrial (PI) products in general from a wide variety of sources; however, a preferred embodiment of the present invention relates to the use of carpet third stream, carcasses, whole carpet, and/or other waste carpet materials as the source of post-consumer and post-industrial fillers and energy.

Used and discarded carpet is a potentially valuable resource. Typical whole carpet construction contains various fiber types that are tufted into a primary backing that is bound as a structural system by a backcoating. Primary and secondary backcoatings contain various polymers and fillers, such as SBR, EVA, PET, PVC, calcium carbonate, clay and glass. In simple terms, the face of carpet is woven through a backing fabric and held in place by an "adhesive" which is often a latex cross-linked polymer or thermoresin loaded with calcium carbonate and/or other mineral filler materials.

The term third stream as frequently used in connection with PC and PI materials, or recycling, in general, refers to a stream of recovered materials containing the highest concentrations of fillers and binders, and, optionally, filler wetting agents, which are extracted from the recycling of whole carpet and the recovery of energy. The third stream is exothermic in nature.

U.S. Pat. No. 5,908,701 teaches the three stream concept in which the first stream reacts with the second stream and the third stream contains filler or fillers.

These petroleum and bio based polymers and mineral fillers can potentially be recovered and reused. Polymeric fibers are being selectively recovered from PI and PC carpet employing grinding and shaving techniques. Carcasses, remnants of the backing structure once the fiber has been shaved off, and the third stream as described earlier are two of the major streams considered of less value in carpet recycling. Other recovery techniques include the processing of the carpet into the caprolactam-monomer process with nylon 6 as the feedstock. The recovered fibers, known as fluff, and caprolactam have value as thermo-plastic resins and fiber resource materials in a range of applications.

It is generally thought that carpet backing has little value as a recycled material and certainly less value than the recovered polymers. Carpet backing is roughly 50% of the weight of whole carpet. It is also generally considered that wet and dirty whole carpet has little value. Wet and dirty whole carpet are not considered priority options when processing "fluff" and caprolactam. Carpet is bulky, difficult to handle and to ship, and in all cases must be kept dry for traditional recycling. Still, it is generally recognized that it would be a significant benefit to the public to keep carpet out of the landfills.

Bell teaches mechanically reducing the size of carpet to the size of calcium carbonate typically used as a filler. U.S. Pat. Nos. 7,045,590 and 6,786,988 and US Patent Publication No. 20050209439 further disclose the incorporation of such fragments in carpet backings. The resulting filler is composed of mineral filler and some resulting fibers due to the challenges of mechanically separating and liberating the fibers and binders from the mineral filler. The final product has limited applications as a stand-alone product due to the physical attributes, composition and chemistry of the recovered materials.

US Patent Publication No. 20100330288 discloses a method for reclaiming inorganic filler from waste carpeting, comprising the steps providing a waste carpeting composition comprising an inorganic filler component and an organic component, and heat treating the waste carpeting composition under conditions effective to separate at least a portion of the organic component from the waste carpeting composition and to provide a reclaimed inorganic filler composition at least substantially free of the organic component, but does not contemplate sufficiently treating the reactants so as to result in a mineral product having the desired features.

US Patent Publication No. 20100044480 and U.S. Pat. No. 7,635,099 respectively focus on mechanical separation and liberation. US Patent Publication No. 20100044480 recognizes the limitations of mechanical separation and introduces a thermal step that attempts to separate more of the fibers. US Patent Publication No. 20100044480 discloses a recovery process for recovering filler material from carpet waste comprising providing carpet; size-reducing the carpet waste into particulate matter comprising polymer fibers, filler material and adhesive material; separating the particulate matter into a first stream comprising substantially polymer fibers and a second stream comprising substantially filler material and adhesive material; and heating the second stream at a temperature sufficient to remove at least some of the polymer fibers remaining in the second stream to enrich the content of filler material in the second stream. U.S. Pat. No. 7,635,099 discloses a component recovery process comprising providing a material feed including fiber, filler and adhesive; shredding the material feed to liberate filler and adhesive from the fiber; screening the shredded material feed yielding at least two resultant streams, a first of which comprises fiber suitable for depolymerization feed stocks and a second of which comprises filler suitable for direct reinforcement in polymer resins; combining the first resultant stream with a liquid to form a slurry; and centrifuging the slurry at a G-Force of 30 G or less.

U.S. Pat. No. 5,728,741 teaches mechanically reducing the waste polymeric materials to 100 times smaller than the waste polymeric material presented and then extruding it for use.

A DOE report entitled "Carpet As An Alternative Fuel in Cement Kilns" (DOE/CH/112390) sets forth the benefits and many problems associated with this approach. Related papers discuss specific aspects of this approach: "A Pilot-Scale Study on the Combustion of Waste Carpet in a Rotary Kiln: Dioxin and Furan Emissions" by Lemieux et al. (IT 32005 Conference) and "Characterization of Transient Puff Emissions from the Burning of Carpet Waste Charges in a Rotary Kiln Combustor" by Realff et al. (Cement Technical Conference, May 2005).

US Patent Publication No. 20090017253 discloses collecting waste carpeting (post-consumer and/or waste from new carpet manufacture) containing calcium carbonate and a thermoplastic resin and size-reducing the waste to a size corresponding to the size of calcium carbonate typically used as a filler. The size-reduced waste carpeting is added as filler to at least one other material, such as polymers in standard latex, EVA, or PVC carpet backcoatings, to provide a composite material, and then the composite is used to make the useful product (such as carpet backcoating, which is used as a primary or secondary backcoating in the manufacture of new carpeting). The invention is a method of recycling waste carpeting and forming a new carpet containing the recycled waste carpeting comprising: collecting waste carpeting containing thermoset materials; processing the waste carpeting to provide a first material from the waste carpeting containing the thermoset materials and reducing the first material to a predetermined size in a range of 50-100 to 95-325 mesh size; adding the first material to a second material to provide a composite material useful in the manufacture of the new carpet; and making the new carpet containing the composite material.

US Patent Publication No. 20090300982 discloses concentrating the calcium carbonate component of waste carpet by mechanical and/or chemical means, then subjecting the calcium carbonate to a heat treatment at a temperature below the decomposition temperature of calcium carbonate to volatilize or modify organic compounds admixed with calcium carbonate so as to yield a free-flowing particulate filler composed of at least about 70% calcium carbonate. The invention is a method for preparing a free-flowing particulate filler material composed predominantly of calcium carbonate from a backing component of waste carpeting containing calcium carbonate useful as a filler material in industrial applications comprising: collecting waste carpeting; separating a backing component containing calcium carbonate from the face fiber component of the collected waste carpeting by subjecting the collected waste carpeting to one or more mechanical comminution processes followed by one or more physical separation processes to separate the collected waste carpeting into at least two physically and chemically distinct fractions, one of which contains substantially all of the backing, or one or more chemical processes to render one or more polymeric components of the face fibers in the collected waste carpet separable from the backing component of the collected waste carpet including dissolution or depolymerization of one or more polymeric components of the face fiber component of the collected waste carpeting, followed by separation of the one or more polymeric components of the face fibers in the collected waste carpet from the backing component of the collected waste carpeting or a combination of mechanical and chemical processes to separate the collected waste carpeting into at least two fractions, one of which contains substantially all of the backing component from the collected waste carpeting; and heating the backing component from the collected waste carpeting to a temperature above about 400° C. but below about 800° C. for a time sufficient to remove substantially all volatile organic compounds from the backing component of the aforesaid collected waste carpeting.

Some have concluded that it is not economically feasible to find markets for over half of the materials in the carpet waste stream. (The Waste to Energy Workshop Group).

Therefore, it can be seen that there has long existed a need for an integrated process which provides for the recovery of the minerals, such as fillers and pigments, in a form and under conditions which will allow them to be reused in the same or related systems from which they were derived, and for the recovery of the energy value of the organic portion of waste streams, which has been unfulfilled prior to the invention of the present process.

BRIEF SUMMARY OF THE INVENTION

The preferred embodiment of the present invention provides a process in which waste material containing mineral fillers and organics is subjected to thermal separation permitting energy recovery from the organics. The mineral filler portion is mechanically sized, slurried and stabilized. The stabilized product may be subjected to further, secondary stabilization followed by soluble salts removal, filtration, concentration, drying and further milling and pulverization as desired. When the desired properties are obtained the product may be utilized in polymer coatings in carpet backings and in other post-consumer coating/filler applications.

Pursuant to the foregoing, it may be regarded as an object of the present invention to overcome the deficiencies of, and provide for improvements in, the state of the prior art as described above and as may be inherent in the same or as may be known to those skilled in the art.

It is a further object of the present invention to provide a process and any necessary apparatus for carrying out the same and of the foregoing character and in accordance with the above objects which may be readily carried out with and within the process and with comparatively simple equipment and with relatively simple engineering requirements.

Still further objects may be recognized and become apparent upon consideration of the following specification, taken as a whole, in conjunction with the appended drawings and claims, wherein by way of illustration and example, an embodiment of the present invention is disclosed.

As used herein, any reference to an object of the present invention should be understood to refer to solutions and advantages of the present invention which flow from its conception and reduction to practice and not to any a priori or prior art conception.

The above and other objects of the present invention are realized and the limitations of the prior art are overcome in the present invention by providing a new and improved method and process applicable to third streams and similar waste streams. A better understanding of the principles and details of the present invention will be evident from the following description taken in conjunction with the appended drawing.

BRIEF DESCRIPTION OF THE DRAWING

FIG. 1 is a schematic flow sheet showing the steps of an illustrative embodiment of the present invention, not all of which are necessarily employed in each and every situation.

The drawing constitutes a part of this specification and includes exemplary embodiments of the present invention, which may be embodied in various forms. It is to be understood that in some instances various aspects of the invention may be shown as exaggerated, reduced, enlarged or otherwise distorted to facilitate an understanding of the present invention. In the drawing, like elements are given the same or analogous references when convenient or helpful for clarity. The same or analogous reference to these elements will be made in the body of the specification, but other names and terminology may also be employed to further explain the present invention.

DETAILED DESCRIPTION OF PREFERRED EMBODIMENTS

For a further understanding of the nature, function, and objects of the present invention, reference should now be made to the following detailed description taken in conjunction with the accompanying drawing. While detailed descriptions of the preferred embodiments are provided herein, as well as the best mode of carrying out and employing the present invention, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The practice of the present invention is illustrated by the included examples, which are deemed illustrative of both the process taught by the present invention and of the results yielded in accordance with the present invention.

The preferred embodiment of the present invention provides a process in which waste material containing mineral fillers and organics is subjected to thermal separation permitting recovery of a mineral product and of energy from the oxidation of the organics. After the thermal separation, the recovered mineral product is at least slurried and stabilized. The stabilized mineral product then is treated to remove soluble salts. The mineral product can then be subjected to further, optional stabilization followed by filtration, concentration, drying, and further milling and pulverization as desired. When the desired properties are obtained, the mineral product may be utilized in polymer coatings in carpet backings and in other post-consumer coating and/or filler applications.

A preferred feed to the process is carpet, and more preferably waste carpet. As with many waste streams, it may be necessary or desirable to physically screen the waste stream to remove outsized materials or to otherwise establish a preferred particle size range. Additional precautions such as magnetic separation to remove magnetic materials and other trash metals may also be taken. To this end, the carpet feed stream preferably is cut, ground, chopped, or otherwise reduced in size to carpet pieces, preferably in the less than 9 in$^2$ range, more preferably in the less than 4 in$^2$ range, and even more preferably in the 1 in$^2$ size range, based on the size of the backing material. That is, the size range is based on the size of the carpet backing material (referred to herein as the length and width) and not the size of the carpet pile (referred to herein as the height).

It has been found that a typical third stream and/or other carpet waste streams may include fibers, polymers, binders, minerals, fillers and pigments. A typical waste stream may be a 50:50 blend of fillers and fiber by volume and about 10% fiber by weight. The terms waste carpet and carpet waste stream as use in this specification includes whole carpet, first streams, second streams, third streams, carpet fiber, carpet backing, and other carpet components, whether or not a conventional waste stream and irrespective of material of manufacture.

Calcium carbonate is a major component of carpet, particularly of carpet backing. In addition to calcium carbonate, other materials found in carpet waste streams may include, but are not limited to: fly ash; ground, milled, or fiber glass; magnesium carbonate (dolomite materials); iron oxides, ferric and ferrous; aluminum trihydrate; barium sulfate; talc, bentonite; antimony trioxide; titanium dioxides; and kaolin, hydrous and/or calcined.

One typical sample of a carpet was composed of 26% organics and 74% inorganics, the inorganics being 64% calcium carbonate and 10% other inorganic fillers and/or pigments, based on the total carpet weight. The composite organics include fiber, polymers and binders that have significant energy value. The BTU/pound value may vary from 3000 to 12000 BTU/lb. The BTU measurement was made with a 6100 Par Calorimeter, but, of course, other suitable measuring techniques and equipment may be used.

The typical values given herein will, of course, change from sample to sample of carpet and from method of recycling to method of recycling, but in general a fair recovery of mineral filler and pigments and a significant energy return may be anticipated.

Turning now to FIG. 1, a flowchart of an illustrative process according to the present invention is shown. This flowchart shows the steps of an illustrative embodiment of the present invention, not all of which are necessarily employed in each and every situation. The general inventive process is a method of recovering a mineral product from carpet, the carpet comprising organic components and mineral components, the method comprising the steps of:

a) providing a feed comprising waste carpet (step 102);

b) thermally separating the organic components from the mineral components by heating the waste carpet, wherein the mineral component is oxidized to form a mineral oxide (step 104);

c) slurrying the mineral oxide with water, whereby the mineral oxide forms a mineral hydroxide (step 110); and d) stabilizing the pH of the slurry, resulting in a slurry of the mineral product comprising mineral carbonates (step 112).

Preferred embodiments further can include the step of:

e) removing soluble salts from the slurry (step 114).

Preferred embodiments also further can include the step of:

f) drying the slurry, resulting in a dry mineral product (step 118).

In preferred embodiments, the thermal separation step 104 occurs at an average process bed temperature in the range of about 600° C. to about 1000° C., the mineral oxide/water slurry comprises in the range of about 15% to about 35%, the slurrying step 110 occurs over a timer period in the range of about 30 minutes to about 24 hours, the stabilizing step 112 results in a slurry pH in the range of about 6 to about 10.

The mineral product comprises a mixture of mineral oxides, mineral hydroxides, and/or mineral carbonates. Using a typical carpet as the carpet feed, the mineral component generally comprises calcium carbonate, magnesium carbonate, and combinations thereof.

In many embodiments of the invention, at least a portion of the mineral product is recycled into the thermal separation step. The carpet feed into feed step 102 typically is polymer based and if subjected to the thermal separation step as is may not oxidize (combust) efficiently. It has been found that adding an ash to the carpet feed, the ash preferably being mineral product previously having been subjected to the thermal separation step, increases the efficiency of the thermal separation step and the quality of the resulting mineral product. In one embodiment, the feed to the thermal separation step comprises up to 70% by weight of the mineral product. In another embodiment, the feed to the thermal separation step 104 comprises up to 45% by weight of the mineral product. In another embodiment, the feed to the thermal separation step 104 comprises from 25% to 45% by weight of the mineral product. In a preferred embodiment, the feed to the thermal separation step 104 comprises from 35% to 45% by weight of the mineral product. In another preferred embodiment, the feed to the thermal separation step 104 comprises approximately 40% by weight of the mineral product.

The waste carpet preferably is not fed to the thermal separation reactor as is, namely, is not fed to the thermal separation reactor in large (room-sized) pieces. Preferably, the feed of carpet is prepared in feed step 102 by comminuting the carpet into pieces, such as shredding, chopping, grinding, shaving, cutting, tearing, and/or shearing the carpet to produce pieces of the carpet of a smaller size. Typical carpet comprises a backing and a pile, comprises a length relative to the run and a width relative to the warp, and comprises a height relative to the pile height. The carpet is reduced in size relative to the warp and run. In one embodiment, the carpet pieces fed to the thermal separation reactor have an area based on the width and length of the carpet of not more than about 9 square inches, preferably of a length less than about 2 inches and a width of less than about 2 inches for an area of not more than about 4 square inches, and more preferably of a size of at most 1 square inch based on the length and the width of the carpet.

The feed waste stream preferably is obtained from carpet recycling and includes fibrous materials and various fillers, pigments, binders and components. As a starting point, the carpet used as the feed to the exemplary process disclosed herein can be assumed to have the typical values as discussed above.

This waste stream is passed to the thermal separation stage in which the waste stream is subjected to a thermal separation step 104 where various thermal separators (reactors) may be employed including kilns, rotary kilns, grate furnaces, moving grate furnaces, fluidized beds, vertical/horizontal calciners, and the like. This controlled thermal separation is carried out to remove organics from the waste stream materials. It is, in general, desired to remove the organics from the minerals without decomposing the calcium carbonate present; however, other special products may be produced by allowing at least a temporary decomposition of the calcium carbonate. For example, the carbon dioxide in calcium carbonate flashes off above 800° C., more specifically at about 825° C., the organics decompose below 700° C., and the calcium carbonate decomposes before 900° C. These facts may be used in tailoring products.

As disclosed herein, a preferable temperature range for the thermal separation process is 600° C. to 1000° C. average bed process temperature for a period of 30 minutes to 12 hours, more preferably at 600° C. to 825° C. average bed process temperature for a period of 30 minutes to 2 hours, and even more preferably at 600° C. to 800° C. average bed process temperature for a period of 30 minutes to 1 hour. In another preferred embodiment of the present invention, the thermal separation may be carried out in an indirectly heated rotary kiln at approximately 700° C. average bed process temperature for approximately a 30 minute resident time with adequate air flow to assure proper combustion. Two or more thermal separation steps 104 can be included depending on the efficiency of the thermal separation step 104, such as the reactors or reaction parameters used in the thermal separation step 104, or if a certain end product is desired. In additional embodiments, the thermal separation is carried out at an average bed process temperature in the ranges of from 600° C. to 800° C., 800° C. to 1000° C., and 825° C. to 1000° C. The mineral oxides produced in the 600° C.-800° C. and 600° C.-825° C. average bed process temperature thermal separation steps 104 can be considered a low or calcium carbonate product and the mineral oxides produced in the 800° C.-1000° C. and 825° C.-1000° C. average bed process temperature thermal separation steps 104 can be considered a high or calcium oxide product.

In the thermal separation step 104, energy from the combustion or oxidation of the organics can be recovered in a recovery of energy step 120. This energy may be used as is or the heat may be used as it is. High and low pressure steam also may be produced, which may be used for electricity or other purposes.

The mineral oxides produced in the thermal separation step 104 can be subjected to a milling step 108, or another process for reducing the structure of the mineral oxides, if desired and/or if necessary for producing a desired end product.

The mineral oxides produced in the thermal separation step 104 then are slurried in a slurrying step 110 by adding water to achieve the desired percentage of solids. As disclosed herein, the mineral oxides are slurried with water to produce 15 to 35% solids slurry within a period of about 30 minutes to 24 hours, whereby the mineral oxide forms a mineral hydroxide. More preferably, the mineral oxides are slurried with water to produce 20 to 35% solids slurry within a period of about 30 minutes to 12 hours. Even more preferably, the mineral oxides are slurried with water to produce 20 to 30% solids slurry within a period of about 30 minutes to 1 hour. The slurry prior to stabilization has a pH in the range of about 10 to 13. The slurrying can take place in a mixing tank with continuous agitation. The mineral oxides present form mineral hydroxides in the presence of water. A slight temperature rise will be observed as the reaction is exothermic.

The slurry is then stabilized in a stabilization step 112 by adjusting the pH to between about 6 and about 10. In a preferred embodiment of the present invention, carbon dioxide gases may be injected into the mixing vessel in a carbonation process. The carbon dioxide gas combines with the water to form carbonic acid which in turn reacts with the calcium ions in the newly made calcium hydroxide. This reaction will form a calcium carbonate salt on the surface of the ground calcium carbonate already in the slurry. One preferred embodiment of the invention uses a Denver Float Cell apparatus or other gas-solid-liquid reactors. The carbon dioxide gas is incorporated into the mixer at the point of the stator or impeller near the bottom of the mixing vessel. The pH and temperature are monitored until the pH is at its lowest point in the range of about 6.0 to 8.0. The carbon dioxide is continuously added until the slurry is stabilized.

The slurrying step 110 and stabilization step 112 produce a surface coating of mineral salts on the surface of a non-reacted portion of the carbonate in the slurry.

This pH stabilization also may be achieved by the use of any number of known acids to lower the pH. Among the suitable acids are phosphoric, citric, acetic and acrylic acids. Preferably, the acid used is a dilute acid. A weak acid also can be used.

Following stabilization, soluble salts and other non-reactive ion species can be and preferably are removed from the system in a soluble salts removal step 114 to enhance and broaden the performance of the solids/products. Various methods of removing soluble salts can be employed, such as but not limited to filters, centrifuges, dewatering, and washing. In one illustrative embodiment, the stabilized slurry may be filtered using any suitable filtration means to remove soluble salts. Vacuum filtration is one preferred manner.

The filtered material then can be and preferably is dried in a drying step 118, resulting in the dry mineral product. Various drying methods and means can be used. One illustrative drying method is in a 110° C. oven in which the excess water is driven off until the mineral product is essentially bone dry.

The final mineral product can be further treated or processed, as disclosed herein, such as but not limited to a milling step 108. The final mineral product then can be subject to various handling techniques in a handling step 122, such as but not limited to storage in silos, bagging, dry transportation, transportation as a slurry, other handling techniques, incorporation into additional processes, and incorporation into products.

Other raw materials or post-consumer or post-industrial materials or both can be blended into the process at one or more steps of the method.

The mineral product produced by the present invention has the following characteristics:
- a bulk density of from about 20 pounds per cubic foot to about 80 pounds per cubic foot
- an oil absorption of less than about 100 g/100 g
- a GE Brightness of from about 40 to about 90
- a pH from about 6 to about 10
- a mean particle size of from about 1.5 microns to about 44 microns.

The mineral product can be tailored to provide a desired oil absorption and density. For example, in one sample, the physical properties obtained were a 26 g/100 g oil absorption; a bulk density of 50 pounds/cubic foot; a pH of 9.4; and 0.6% moisture. Such a product was incorporated into a SBC carpet backing pre-coat formulation with suitable viscosity and stability. The coated films perform well with no cracking and with good flexibility.

In other mineral products produced using the present invention, GE brightness values of 40, 50, 86 and 90 have been obtained; particle size distributions of 1.5, 2, 40, and 80 microns have been obtained; oil absorption values of 20, 25, and 30 have been obtained; and pH values in the 6 to 10 range have been obtained. pH values in the 7 to 9 range are preferred, and if the pH is in the 9.5 to 10.0 range, a dry acid may be added to ensure stable properties in the final compound.

Once the mineral product is obtained through the present invention, it can be further treated if desired to produce other valuable products. For example, the minerals separated in the thermal separation step 104 can be milled and pulverized in a milling step 108 using any of various known suitable dry milling techniques such as hammer mills pulverizers, ball mills and the like. This pulverization, milling or grinding is employed to expose as many distinct particle surfaces as possible for reaction in the following steps and stages of the process. The dried mineral product material may be further milled or pulverized in another milling step 108 to assure uniformity and better dispersion and to give the desired oil absorption properties. If oil absorption values are in excess of 40 or if lower oil absorption values are otherwise desired, ball milling may be employed.

Milling the mineral product of the present invention alters the morphology or crystalline structure of the mineral product by creating or destroying or reducing the structure to provide the desired degree of structure to yield, for example, the desired oil absorption and density for the desired end use.

The present invention is designed to fill the needs of the carpet, floor coverings, composite tile, and carpet recycling industries. For example, the recovered mineral product, which may include or be fillers and/or pigments, may be designed and engineered for structure, surface area, pore volume, light scatter and/or opacity. These materials may be considered to be structured pigments or merely specially tailored pigments or fillers and may be used to increase or decrease structure, pore volume, surface area, brightness and/or opacity, increase bulk, and/or increase the coefficient of friction. The materials of the present invention are very efficient at desired filler levels.

In order to achieve such unique combinations of properties it may be necessary and or desirable to blend or co-react various materials. For example, the materials of the preferred embodiments as described above may be blended with hydrous or calcined kaolin, or silica or silicates or other carbonates and the like. For example, U.S. Pat. Nos. 4,812,299 and 4,879,058 teach the creation of various levels of structure in connection with the reaction of alkali metal silicates and kaolin. These references also teach the recognized and standard testing procedures for such processes and materials and are hereby incorporated by reference. Sacto et al in a 1996 abstract teaches varying surface area and total pore volume with calcining of materials including kaolinite. An abstract by Youssef et al published in Adsorption Science and Technology, vol. 19, no. 7 (1 Sep. 2001) teaches changes in titania surface area and total pore volume attributed to phase changes and sintering. Such materials and techniques may be used to tailor the products of the present invention by altering the structure, surface area, pore volume, and oil absorption of specific nanoparticles, pigments and fillers. Acids and base combinations can be used to selectively remove materials which otherwise might interfere with desired product properties.

In some cases the heat treatment may be used to create structure and subsequent milling and/or pulverization may be use to remove some portion of the structure created, with the resulting effects on oil absorption and the like related properties. For example, the materials of the preferred embodiments described above may be combined with a structured, composite filler that is a heat treated recycled, post-consumer mineral filler containing calcined clay and titanium dioxide. Such materials may be produced by heat treating a dry, hydrous kaolin from a mining operation or a waste stream in a furnace at a controlled temperature of from 600° C. to 1100° C. for from 10 to 45 minutes. It is a stable and inert composite designed to provide enhanced physical and chemical qualities in a broad range of applications. Typical products may have a pore volume in excess of 0.7 cc/g. Brightness, particle size and surface chemistry are among the filler properties that can be modified, customized and tailored for specific applications.

Milling may be done with any suitable mill including ball mills, rod mills, pebble mills, sand mills, rock tumblers and the like. Ceramic mills are a preferred device, including aluminum/ceramic, jade, and steel lined mills using, for example 1-1¼" cylindrical media.

Where filler is a product of the present invention, it may be used in formulations with aluminum trihydrate, and ammonium lauryl sulfate. The products of the present invention including blends may be treated with various surface treatments such as with aminosilanes.

To the inventors' knowledge, the recovered minerals and fillers and/or pigments of the present invention are the most eco-efficient post-consumer and/or post-industrial renewable resources ever commercialized. Moreover, the process as set forth herein recovers these materials using autogenous energy inherent in the waste stream, resulting in the overall net generation of energy.

An illustrative product can be obtained by reducing the structure of the mineral product by milling, reducing the oil absorption of the mineral product by milling, and incorporating the mineral product into a further process or product near, at or just above the critical pigment volume concentration of the mineral product. Such further products include but are not limited to sealants, adhesives, and coatings. To this end, the method of the present invention can further comprise incorporating the mineral product into an end use product near, at, or just above the critical pigment volume concentration where the mineral product has had its structure and oil absorption reduced by milling. While the concept of the critical pigment volume concentration (CPVC) has been known for some time, it does not appear to have been widely or expressly used in many pigment systems. The concept may be related to other concepts such as pigment packing factor, surface area, specific particle surface, particle spacing, structure, texture, particle spread and distribution pattern, the packing of binary mixtures of pigment particles, particle packing, concentration, densities, stirring, porosity, and oil absorption; to physical properties such as density, tensile strength, surface tension, and adhesion; to permeability properties such as porosity, blistering, abrasion resistance, holdout, and capillarity; and to optical properties such as light scattering, contrast ratio, tinting strength, hiding power, efficiency, gloss, sheen and the like.

The latex critical pigment volume concentration is of interest in many systems and is expressed in figures as the latex porosity index and binder efficiency. The concept of reduced pigment volume concentration ^ as a formulating parameter where it is the ratio of the pigment volume concentration to the critical pigment volume concentration may be expressed as:

$$\Lambda = PVC/CPVC,$$

Where $\Lambda > 1$, the CPVC has been exceeded and porosity (air pockets) is present in the film. Where $\Lambda < 1$, the PVC is less than the CPVC and pigment separation is present in the pigment/binder film. See Patton, Temple C., Paint Flow and Pigment Dispersion, 2nd Ed. John Wiley & Sons N.Y. (1979) pp. 126-161, 170-204, 258-261.

While latex systems have been referred to herein as a preferred embodiment, many other systems and components may be utilized and employed, including, but not limited to precoats, adhesives, and coatings. Specifically included are: pre-coats, adhesives, and coatings including paints, backings, clear coatings such as varnishes, lacquers, shellacs, stains and water repellant-coatings.

The coatings may also be defined by use, such as architectural coatings, industrial coatings and specification coatings. Architectural coatings include wood coatings, masonry coatings and artist's coatings. Industrial coatings include automotive coatings, sealant coatings and marine coatings. Specification coatings include pipeline coatings, traffic marker coatings, aircraft coatings, and nuclear power plant coatings. Coating components may include binders, liquid components, functional fillers, colorants and coating additives.

Binders may include oil-based binders which may be further defined as oils, alkyd resins including oil length alkyd binders, high solid alkyd coatings, uralkyd coatings, water borne alkyd coatings and the like. Oil-based binders include but are not limited to oleoresinous binders and fatty acid epoxy esters. Other binders include polyester resins; modified cellulose binders; polyamide and amidoamine binders; amino resins, urethane binders including water-borne urethanes and urethane powder coatings; phenolic resins including resole and novolak; epoxy resins including ambient condition curing epoxies, bake curing epoxies, electrodeposition epoxies, powder coating epoxies, and cycloaliphatic epoxies; polyhydroxyether binders; acrylic resins including thermoplastic acrylic resins, water-borne thermoplastic acrylic resins and coatings; thermosetting acrylic resins including ethyl vinyl acetates, acrylic-epoxy combinations, acrylic-amino combination, acrylic-urethane combinations, and water-borne thermosetting acrylics; polyvinyl binders including plastisols and organisols, powder coatings and water-borne coatings; rubber resins including chlorinated rubber resins and synthetic rubber resins; bituminous binders; polysulfide binders; and silicone binders.

Liquid components may include solvents, thinners and diluents may include hydrocarbons, oxygenated solvents, chlorinated hydrocarbons, nitrated hydrocarbons and other miscellaneous organic liquids. Among the hydrocarbons are aliphatic hydrocarbons, cycloaliphatic hydrocarbons, terpene hydrocarbons and aromatic hydrocarbons. Among the oxygenated solvents are the alcohols, ketones, esters, glycol ethers and ethers.

Colorants may include dyes and pigments including corrosion resistance pigments, camouflage pigments, color property pigments pearlescent pigments, metallic pigments and extender pigments.

Coating additives may include preservatives, wetting additives and dispersants, buffers, rheology modifiers, defoamers, catalysts including driers, acids, bases, and urethane catalysts, antiskinning agents, light stabilizers, corrosion inhibitors, dehydrators, electrical additives, anti-insect additives, and enzyme and biomolecule additives.

As disclosed herein, the mineral product after its initial processing may need to have its structure reduced as reflected by a reduction of its oil absorption value from on the order of 40 to 10-30. The reduction in structure may be obtained by ball milling, rod milling, and the like means of reducing structure which is generally changed into a multiplicity of rounded clumps. These reduced structure mineral products may be used in floor covering, laminated materials, wire and cable applications and the like both for their inherent properties and to provide 10% or more post-consumer product and/or post-industrial product. The density may also be raised from 40 to 60-100. The drying rate may be likewise increased.

Other post-industrial products such as ground glass and fly ash also may be used as desired for specific purposes, and blends of materials are contemplated as a part of the present invention.

A further alternative embodiment contemplates the use of high temperature calcinations (vitrification) to produce a suitable post-consumer product.

The mineral product of the present invention tends to absorb heat and act as an insulator to extinguish fire even when replacing up to 25 parts of aluminum trihydrate. Some aluminum trihydrate may be worked into the pores of the functional filler to provide additional fire retardant properties.

The mineral product of the present invention may find particular utility in tile and cushion backing formulations.

Following are two illustrative examples of the process of the invention.

EXAMPLE 1

Carpet Recycling Waste Stream—Mineral and Energy Recovery Part I

Scope:

Initial work was performed on a waster carpet sample obtained from a carpet company, and a later sample was obtained from a recycling company, for the purpose of separating and recovering the minerals for re-use as post-consumer recycled filler in various applications. The sample as received was basically a 50:50 blend of powder and fiber by volume and generally 10% fiber by weight. The purpose of this example was to determine: (1) the LOI or loss of ignition of the above sample to establish percent mineral content and percent organics content; and (2) the BTU value of the sample by means of Oxygen Bomb Calorimeter to establish the energy value of the composite organics within the sample.

Design:

(1) The sample was tested for LOI as received with fiber, polymer, minerals and all other constituents using a Muffle Furnace Method at 1050° C. temp. The as received sample was then oxidized at 700° C. and 900° C. for thermal separation of the organics and minerals. The oxidized materials at 700° C. and 900° C. were then tested for LOI at 1050° C. to determine how much calcium carbonate was present in the sample. Since the $CO_2$ in the calcium carbonate will flash off at somewhere above 800° C., we can theorize that the organics decompose before 700° C. and the $CaCO_3$ decomposes before 900° C. thus giving us the ability to determine what the difference is after each sample is again measured at the LOI temperature of 1050° C.

(2) The as received sample was then tested for BTU value as well as physically separated samples which were dry screened over a #8 mesh screen to remove a majority of the fibrous organics from the composite. The results gave an indication of the need for separation before oxidation as well as a better understanding of the energy value of the total composition as well as the separate components. The method of measurement for determination of BTU value is a Par 6100 Oxygen Bomb Calorimeter.

Results:
LOI Determination @ 1050° C.

|  | % LOI | % Retained |
| --- | --- | --- |
| $3^{rd}$ Stream as received | 54.2 | 45.8 |
| $3^{rd}$ Stream 700° C. | 28.13 | 71.87 |
| $3^{rd}$ Stream 900° C. | .69 | 99.31 |

BTU Determination 6100 Par Calorimeter

|  | BTU/lb |
| --- | --- |
| $3^{rd}$ Stream as received | 3967.0 |
| $3^{rd}$ Stream −8 mesh | 3395.5 |
| 3rd Stream +8 mesh | 7131.2 |

Conclusions:

In theory one can evaluate the LOI data and conclude that 26% of the sample is organic with 64% calcium carbonate and 10% other minerals. This is based on the following calculations:

$$\text{Total loss} 54.2\% - ^{CO_2}28.13\% = 26.07\%^{organics}$$

After organics are removed the total retained inorganics will be 73.93% or $$\text{Total sample} 100\% - ^{organics} \text{removed} 26.07\% = 73.93\%^{total\ retained\ inorganics}$$

Assuming that $CaCO_3$ decomposes as 44% $CO_2$ and 56% Ca we can conclude that the 28.13% loss of the 700° C. was $CO_2$ at 44% and Ca at 56%=35.8% Ca+28.13% $CO_2$=63.93% $CaCO_3$.

The total retained inorganics being 73.93%−63.93% CaCO3=10% other minerals.

So all in all we have roughly 26% organics, 74% inorganics with 64% being $CaCO_3$ and 10% other inorganics. This can of course change from sample to sample and method of recycling to method of recycling but as a general rule of thumb, knowing what the mineral filler loading of carpet is we can safely say this is what would be expected as a fair recovery.

With energy cost continuing to rise and the constant need for more sustainable practices. The BTU data shows much promise as a potential source for alternative energy either to go back into the carpet manufacturing process or to be used in other industries looking for energy credits or energy from renewable and recycling processes.

EXAMPLE 2

Carpet Recycling Waste Stream—Mineral and Energy Recovery Part II (1) Scope:

Initial work was performed on a waste carpet sample obtained from a carpet company, and later sample was obtained from a recycling company, for the purpose of separating and recovering the minerals for re-use as post-consumer recycled filler in various applications. The above sample as received is basically a 50:50 blend of powder and fiber by volume and generally 10% fiber by weight. It has been determined in part I that a suitable quantity of mineral filler can be recovered and now the purpose of this experiment is to determine the quality of the post-consumer minerals from waste carpet recycling, for carpet filling applications as well as the stability of these minerals after various separation techniques have been applied.

Design:

To remove organics from the waste carpet material, first a controlled thermal separation is carried out in order to remove the organics from the minerals without decomposing the $CaCO_3$. This separation was achieved with an indirect rotary kiln at 700° C. for approximately 30 minutes dwell time with adequate air flow in the tube to assure proper combustion.

Pulverization or grinding was then used to expose as many distinct particle surfaces as possible for preparation of the next stage in the process.

This stage is also a preparation step that requires wetting of pulverized material at a rate of 20-30% solids in a mix tank with continuous agitation in the tank. This mixing occurs for approximately 30 minutes to 1 hour. The calcium oxide present in the oxidized material formed calcium hydroxide in the presence of $H_2O$. The pH was measured at this point and recorded; the solution pH increased at this time to a range of 10-13 pH. Also a slight temperature rise was experienced due to this being an exothermic reaction.

The next step is pH stabilization, which was achieved by using various types of weak or dilute acids to lower pH. In this case $CO_2$ gas was injected in the mixing vessel using a Denver Float Cell apparatus. With this type of apparatus, the $CO_2$ gas was incorporated into the mixer at the point of the stator or impeller near the bottom of the mixing vessel. The $CO_2$ gas combined with the $H_2O$ and formed carbonic acid, which in turn reacted with the calcium ions in the newly made calcium hydroxide. This reaction formed calcium carbonate salt onto the surface of the already present ground calcium carbonate in the solution. The pH and temperature was monitored for the duration of this step, until the pH was at its lowest point (6.0-8.0). The gas was continuously added until stable. Then another weak or dilute organic acid was added, such as phosphoric, citric, acetic, or acrylic acid, to complete stabilization.

The pH stabilized slurry was then filtered by means of vacuum filtration on a Buckner funnel type filter.

The next phase in the process was drying in an 110° C. oven to drive off all excess $H_2O$, until bone dry. The sample was tested for quality at this time for pH, oil absorption, bulk density, moisture, and particle size distribution (optional). If oil absorption is not below 40 or if lower numbers are needed, then ball milling can be done in the next step. If pH is still above the 9.5 to 10.0 range, then a dry acid may be added to ensure stable properties in the final compound.

Next the dried sample was milled or pulverized if necessary to assure uniformity and possibly give better oil absorption properties if needed. This also gives better uniformity and allows a better dispersion in final application compounding. The sample can be tested again if pulverization or milling is employed, to ensure quality such as pH, oil absorption, bulk density, moisture, and particle size distribution (optional). The material then was incorporated into a carpet backing pre-coat to assure compatibility. This includes viscosity, viscosity stability over time, and film draw-downs of the final compound to check for cracking, and flexibility/strength properties of dried films.

Results:

TABLE 1

Physical Properties of Final Product

| | |
|---|---|
| Oil Absorption, gm./100 gm. | 26.4 |
| Bulk Density, lb./cu.ft. | 50.0 |
| pH | 9.4 |
| Moisture, % | 0.6 |

TABLE 2

Columbia Recycling 700° C. Pre-Coat Formulation

| Batch Size | 1136.24 | | | |
|---|---|---|---|---|
| Target % Solids | 79.5% | | | |
| Ingredients | % Solids | Dry Parts | Wet Parts | Wet Parts × 2 |
| Make Down $H_2O$ | | | 16.66 | 33.32 |
| SBR Latex | 52.50% | 100.00 | 190.48 | 380.96 |
| Columbia 700° C. | 100.00% | 101.00 | 101 | 202.00 |
| GCC | 100.00% | 249.00 | 249 | 498.00 |
| (ALS) | 30.00% | 1.60 | 5.33 | 10.66 |
| (Thickener) | 13.00% | 0.65 | 5.00 | 10.00 |
| Totals | | 451.14 | 567.47 | 1134.94 |
| factor | 2.002 | | | |
| Weight per Gallon | 11.00 | | | |
| Target Viscosity | | | | 9000-10000 |
| Brookfield Viscosity VAF | | | | |

| #5 spindle @ 20 rpm's | |
|---|---|
| 1st Day w/o ALS | 1100 |
| w/ ALS 1st Day | 1000 |
| w/ Thickener 1st Day | 8600 |
| 2nd Day | 12600 |
| 3rd Day | 13500 |
| Beat Back | 12500 |

Conclusions:

The data in Table 1 shows that the physical properties of the final product are within specifications of our preferred target ranges for filler of this type. The data in Table 2 shows that the product performed favorably in an SBR carpet pre-coat formulation. Viscosity was well below target cps without thickener, thus requiring additional thickener. This shows that higher solids can be achieved thus reducing thickener demand. Three day stability/viscosity builds also look very good with beat back being slightly higher but not unmanageable. Coating films performed very well with no cracking and very good flexibility of the dried films. Over all, this product can be used as a potential drop product in replacement for current fillers.

The method of the present invention can also include the optimizing of the production and recycling of materials from a source of a waste or by-product stream of carpet materials which contain recoverable minerals/fillers/pigments, recovering those materials, and re-cycling them to the source or other end users including:

a) locating and identifying sources of waste or by-product streams containing recoverable mineral/fillers/pigments;
b) determining the susceptibility of said streams to treatments producing a product for sale or re-cycling to the source of the waste or by-product streams or to other end users;
c) gathering information and storing said information for retrieval and use from various sources and experts related to the construction and operation of an energy and minerals recovery facility on-site or adjacent to said source of said waste or by-product streams;
d) analyzing the data produced by the determination of step b) and that data produced by step c);
e) performing a cost benefit analysis of the data produced by the analysis of step d) with regard to: the ecological balance, the materials balance, the energy balance, and the financial/economic balance;
f) integrating and optimizing the analysis of step e) to synthesize, optimize and produce a proposed course of action to the mutual benefit of the owners of said source and the owners and operators of the process of the present invention including the independent operation or integration of various unit operations phases, options and processes of the various and respective plants on a regional, geographic or territorial, optimized cluster basis;
g) negotiating with said source of said waste or by-product streams regarding the construction and operation of an energy and minerals recovery facility on said source's site or adjacent thereto and with regard to the integration of various plants and operations;
h) negotiating with raw material suppliers to supply materials to said energy and minerals recovery facility;
i) constructing and operating the various independent or integrated operations on a regional, geographic or territorial, optimized cluster basis including a pigment design plant on-site of said source or adjacent to said source or in a regional, geographic or territorial, optimized cluster location with regard to one or more sources;
j) receiving waste materials from said sources;
k) treating said waste materials from said sources in said energy and minerals recovery facility; and
l) returning a portion of said waste material to the source or sources in the form of materials including (materials?) minerals/fillers/pigments in forms suitable or adaptable for use in processes carried out by said sources.

Suitable products for blending include products produced by calcining (a) a dry, hydrous processed kaolin clay from clay mining operations or (b) from a paper mill waste stream or combinations and blends of both in a furnace at a substantially uniform, controlled temperature in the range of from 600° C. to 1100° C. for from 10 to 45 minutes.

As a further example of the present invention based upon the disclosure set forth above, is and will be further made apparent that the present invention is part of the drive toward sustainability and eco-efficiency. This drive is based on management of residuals and post-consumer filler/functional filler designs for sustainability.

While throughout this description, we have referred to various materials, chemicals, and apparatus as being presently preferred, it will be clear to one skilled in the art that other materials, chemicals, and steps may be employed which will also provide the advantages as herein set forth in connection with the present invention. Additionally, to provide a description of the present invention that is both concise and clear, various examples of ranges have been set forth herein and in all cases should be read as including all intermediate ranges and combinations thereof.

The embodiment described herein in detail is for exemplary purposes and is subject to many different variations in structure, design application, and methodology. Because many varying and different embodiments may be made within the scope of the inventive concepts herein taught, and because many modifications may be made in the embodiment herein detailed in accordance with the descriptive requirement of the law, it is to be understood that the details herein are to be interpreted as illustrative and not in a limiting sense. It will be understood in view of the instant disclosure, that numerous variations of the invention are now enabled to those skilled in the art. Many of the variations reside within the scope of the present teachings. The present disclosure is not intended to limit the scope of the invention to the particular forms set forth, but on the contrary, it is intended to cover such alternatives, modifications, and equivalents as may be included within the spirit and scope of the teachings of the present invention. Accordingly, the invention is to be broadly construed and is to be limited only by the spirit and scope of the claims appended hereto.

What is claimed is:

1. A method of recovering a mineral product from carpet, the carpet comprising an organic component and a mineral component, the method comprising the steps of:
   a) providing a feed comprising waste carpet;
   b) thermally separating the organic component from the mineral component by heating the waste carpet, wherein the mineral component is oxidized to form a mineral oxide and the organic component is oxidized to a gaseous or vapor phase;
   c) slurrying the mineral oxide with water to form a slurry, whereby the mineral oxide forms a mineral hydroxide; and
   d) stabilizing the pH of the slurry, resulting in a slurry of the mineral product comprising mineral carbonates.

2. The method of claim 1, further comprising the step of removing soluble salts from the slurry.

3. The method of claim 1, further comprising the step of drying the slurry, resulting in a dry mineral product.

4. The method of claim 2, further comprising the step of drying the slurry, resulting in a dry mineral product.

5. The method of claim 1, wherein the organic component is separated from the mineral component by heating the waste carpet to an average process bed temperature in the range of about 600° C. to about 1000° C.

6. The method of claim 1, wherein the organic component is separated from the mineral component by heating the waste carpet to an average process bed temperature in the range of about 600° C. to about 800° C.

7. The method of claim 1, wherein the organic component is separated from the mineral component by heating the waste carpet to an average process bed temperature in the range of about 600° C. to about 825° C.

8. The method of claim 1, wherein the organic component is separated from the mineral component by heating the waste carpet to an average process bed temperature in the range of about 800° C. to about 1000° C.

9. The method of claim 1, wherein the organic component is separated from the mineral component by heating the waste carpet to an average process bed temperature in the range of about 825° C. to about 1000° C.

10. The method of claim 1, wherein the slurry comprises in the range of about 15% to about 35% solids slurry.

11. The method of claim 1, wherein the mineral oxide is slurried with water within a time period range of about 30 minutes to about 24 hours.

12. The method of claim 1, wherein the pH of the slurry is stabilized in a pH range of between about 6 and about 10.

13. The method of claim 1, wherein the slurry comprises in the range of about 20% to about 30% solids slurry.

14. The method of claim 1, wherein the mineral oxide is slurried with water within a time period range of about 30 minutes to about 12 hours.

15. The method of claim 1, wherein the slurry prior to stabilization has a pH in the range of approximately 10 to 13.

16. The method of claim 1, wherein at least a portion of the mineral product is recycled into the thermal separation step.

17. The method of claim 16, wherein the feed to the thermal separation step comprises up to 70% by weight of the mineral product.

18. The method of claim 16, wherein the feed to the thermal separation step comprises up to 45% by weight of the mineral product.

19. The method of claim 16, wherein the feed to the thermal separation step comprises from 25% to 45% by weight of the mineral product.

20. The method of claim 16, wherein the feed to the thermal separation step comprises from 35% to 45% by weight of the mineral product.

21. The method of claim 16, wherein the feed to the thermal separation step comprises approximately 40% by weight of the mineral product.

22. The method of claim 1, wherein the feed of waste carpet is prepared by comminuting the carpet to produce pieces of the carpet.

23. The method of claim 22, wherein the carpet comprises a backing and a pile, comprises a length relative to the run and a width relative to the warp, comprises a height relative to the pile height, and wherein the pieces of the carpet have a length of less than two inches and a width of less than two inches.

24. The method of claim 23, wherein the carpet pieces have a size of at most one square inch based on the length and the width.

25. The method of claim 1, wherein said mineral product has a bulk density of from about 20 pounds per cubic foot to about 80 pounds per cubic foot; an oil absorption of less than about 100 g/100 g; a GE Brightness of from about 40 to about 90; a pH from about 6 to about 10; and a mean particle size of from about 1.5 microns to about 44 microns.

26. The method of claim 1, wherein the mineral components are milled and/or pulverized to expose distinct particle surfaces for subsequent operations.

27. The method of claim 26, wherein the subsequent operations are selected from the group consisting of improved dispersion, increased bulk density and reduced oil absorption.

28. The method of claim 1, wherein the method is net exothermic.

29. The method of claim 1, wherein energy is recovered from the thermal separation step.

30. The method of claim 29, wherein the energy recovered from the thermal separation step is used as heat or for its heat value.

31. The method of claim 29, wherein the energy recovered from the thermal separation step is used to produce high or low pressure steam.

32. The method of claim 29, wherein the energy recovered from the thermal separation step is used to produce electricity.

33. The method of claim 1, wherein the slurrying and stabilization steps produce a surface coating of mineral salts on the surface of a non-reacted portion of the mineral carbonate in the slurry.

34. The method of claim 1, further comprising the steps of:
reducing the structure of the stabilized mineral product by milling;
reducing the oil absorption of the stabilized mineral product by milling; and
incorporating the stabilized mineral product into a further process or product near, at or just above the critical pigment volume concentration of the mineral product.

35. The method of claim 1, wherein the mineral product has a morphology or crystalline structure that is tailored to provide a desired oil absorption and density.

36. The method of claim 1, further comprising the step of blending other materials selected from the group consisting of raw materials, post-consumer materials, post-industrial materials, and combinations thereof at least one step of the method.

37. The method of claim 1, further comprising at least two thermal processing steps.

38. The method of claim 1, further comprising providing a specified amount of post-consumer product and/or post-industrial product to or constituting an end use product where the post-consumer product and/or post-industrial product is a filler pigment produced from a carpet waste stream obtained from carpet recycling and including fibrous, organic materials and various mineral fillers, the end product produced at least in part by heat treatment of the carpet waste stream, said filler pigment providing a post-consumer and/or post-industrial component to the end use product.

39. The method of claim 1, further comprising the step of incorporating the mineral product into an end use product near, at, or just above the critical pigment volume concentration where the mineral product has had its structure and oil absorption reduced by milling.

40. The method of claim 1, wherein the mineral product comprises a mixture of mineral oxides, mineral hydroxides, and mineral carbonates.

41. The method of claim 1, wherein the thermal separation step is carried out in a reactor selected from the group consisting of kilns, rotary kilns, grate furnaces, moving grate furnaces, and fluidized beds.

42. The method of claim 1, wherein the thermal separation step is carried out in a rotary kiln.

43. The method of claim 1, wherein the mineral component is selected from the group consisting of calcium carbonate, magnesium carbonate, and combinations thereof.

44. A method of recovering a mineral product from carpet, the carpet comprising an organic component and a mineral component, the method comprising the steps of:
a) providing a feed comprising waste carpet;
b) thermally separating the organic component from the mineral component by heating the waste carpet, wherein the mineral component is oxidized to form a mineral oxide and the organic component is oxidized to a gaseous or vapor phase;
c) slurrying the mineral oxide with water, whereby the mineral oxide forms a mineral hydroxide;
d) stabilizing the pH of the slurry, resulting in a slurry of the mineral product comprising mineral carbonates; and
e) removing soluble salts from the slurry.

45. The method of claim 44, wherein the organic component is separated from the mineral component by heating the waste carpet to an average process bed temperature in the range of about 600° C. to about 1000° C.

46. The method of claim 44, wherein the slurry comprises in the range of about 15% to about 35% solids slurry.

47. The method of claim 44, wherein the mineral oxide is slurried with water within a time period range of about 30 minutes to about 24 hours.

48. The method of claim 44, wherein the pH of the slurry is stabilized in a pH range of between about 6 and about 10.

49. The method of claim 44, wherein the slurry prior to stabilization has a pH in the range of approximately 10 to 13.

50. The method of claim 44, wherein at least a portion of the mineral product is recycled into the thermal separation step.

51. The method of claim 44, wherein the feed of waste carpet is prepared by comminuting the carpet to produce pieces of the carpet.

52. The method of claim 44, wherein the method is net exothermic and energy is recovered from the thermal separation step.

53. The method of claim 44, further comprising the steps of:
reducing the structure of the stabilized mineral product by milling;
reducing the oil absorption of the stabilized mineral product by milling; and
incorporating the stabilized mineral product into a further process or product near, at or just above the critical pigment volume concentration of the mineral product.

54. A method of recovering a mineral product from carpet, the carpet comprising an organic component and a mineral component, the method comprising the steps of:
a) providing a feed comprising waste carpet;
b) thermally separating the organic component from the mineral component by heating the waste carpet, wherein the mineral component is oxidized to form a mineral oxide and the organic component is oxidized to a gaseous or vapor phase;
c) slurrying the mineral oxide with water, whereby the mineral oxide forms a mineral hydroxide;
d) stabilizing the pH of the slurry, resulting in a slurry of the mineral product comprising mineral carbonates;
e) removing soluble salts from the slurry; and
f) drying the slurry, resulting in a dry mineral product.

55. The method of claim 54, wherein the organic component is separated from the mineral component by heating the waste carpet to an average process bed temperature in the range of about 600° C. to about 1000° C.

56. The method of claim 54, wherein the slurry comprises in the range of about 15% to about 35% solids slurry.

57. The method of claim 54, wherein the mineral oxide is slurried with water within a time period range of about 30 minutes to about 24 hours.

58. The method of claim 54, wherein the pH of the slurry is stabilized in a pH range of between about 6 and about 10.

59. The method of claim 54, wherein the slurry prior to stabilization has a pH in the range of approximately 10 to 13.

60. The method of claim 54, wherein at least a portion of the mineral product is recycled into the thermal separation step.

61. The method of claim 54, wherein the feed of waste carpet is prepared by comminuting the carpet to produce pieces of the carpet.

62. The method of claim 54, wherein the method is net exothermic and energy is recovered from the thermal separation step.

63. The method of claim 54, further comprising the steps of:
reducing the structure of the stabilized mineral product by milling;
reducing the oil absorption of the stabilized mineral product by milling; and
incorporating the stabilized mineral product into a further process or product near, at or just above the critical pigment volume concentration of the mineral product.

* * * * *